United States Patent
Hung et al.

(10) Patent No.: US 8,687,474 B2
(45) Date of Patent: Apr. 1, 2014

(54) RECORDING APPARATUS AND METHOD

(75) Inventors: Yung-Hui Hung, Taipei (TW); Cheng-Pi Lee, Taipei (TW); Kun-Long Li, Taipei (TW); Min-Hao Pan, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 13/611,262

(22) Filed: Sep. 12, 2012

(65) Prior Publication Data
US 2013/0155829 A1 Jun. 20, 2013

(30) Foreign Application Priority Data
Dec. 16, 2011 (TW) .............................. 100146888 A

(51) Int. Cl.
*G11B 7/00* (2006.01)

(52) U.S. Cl.
USPC ..................................... 369/59.11; 369/59.12

(58) Field of Classification Search
None
See application file for complete search history.

(56) References Cited

U.S. PATENT DOCUMENTS

| | | | |
|---|---|---|---|
| 7,050,377 B1 * | 5/2006 | Nobukuni et al. | 369/59.11 |
| 2001/0053115 A1 * | 12/2001 | Nobukuni et al. | 369/59.12 |

* cited by examiner

*Primary Examiner* — Van Chow
(74) *Attorney, Agent, or Firm* — Roger G. J. Chen

(57) ABSTRACT

A recording apparatus characterized in that comprising a firmware configured to execute the following operation: performing a recording operation onto a rewritable optical recording medium with a recording speed selected from one of a plurality of recording speeds for an one-time optical recording medium; wherein the recording layer of the rewritable optical recording medium comprises at least four elements from Ge, In, Sb, Te, and Sn, wherein the component proportion of Sb/Te is ranged from 3 to 8, and the thickness of the recording layer is ranged from 3 nm to 25 nm.

6 Claims, 2 Drawing Sheets

--- reading the disc information in the lead-in zone of the rewriteable medium (S201)

↓ performing a recording operation with one of a plurality of recording speeds for one-time recording mode in rewriteable medium (S202)

↓ finishing the recording operation (S203)

↓ performing another recording operation with a suggested rewritable recording speed from the disc information in rewriteable medium (S204)

↓ finishing the recording operation (S205)

RECORDING APPARATUS AND METHOD

CROSS-REFERENCE TO RELATED APPLICATION

This application claims priority from Taiwan Patent Application No. 100146888 filed on Dec. 16, 2011, which is hereby incorporated herein by reference in its entirety.

FIELD OF THE INVENTION

This invention relates to a recording apparatus, specifically, to a recording apparatus that can provide faster recording speed for rewritable recording media.

BACKGROUND OF THE INVENTION

The conventional rewritable recording media, such as CD-RW (CD-RW book PARTIII Ultra-Speed Version 1.0, 24× speed), DVD+RW (DVD+RW book PART1 Version 1.0, 8× speed), DVD-RW (DVD-RW book PART1 Version 1.2, 6× speed), and BD-RE (BD-RE book PART1 Version 2.12, 2× speed), can only provide rewritable recording operation with lower speed. Therefore, when a high speed recording operation is required in order to save time, it needs to use an one-time recording media, such as DVD-R 16× (DVD-R book PART1 Version 2.1, 16× speed) to perform high speed recording (see Table 1 below).

TABLE 1

| Type | Highest recording speed |
|---|---|
| CD-R | 48x |
| CD-RW | 24x |
| DVD+R | 16x |
| DVD+RW | 8x |
| DVD-R | 16x |
| DVD-RW | 6x |
| BD-R | 6x |
| BD-RE | 2x |

FIG. 1 shows a flow chart of a conventional rewritable recording medium (disc) when performing a recording operation. As shown in FIG. 1, in step S101, the recording apparatus determines a recording mode by reading the disc information in the lead-in zone of the rewriteable medium. In step S102, the recording apparatus performs a recording operation with a suggested rewritable recording speed from the disc information in rewriteable medium. In step S103, the recording operation is finished. After that, when the user wants to perform another recording operation with the rewritable recording medium, in step S104, the recording apparatus performs another recording operation with a suggested rewritable recording speed from the disc information. In step S105, the recording operation is finished. Step S104 and Step S105 can repeat according to the user's need.

However, in a situation that a rewritable recording medium is prepared, if the rewritable recording medium can replace the one-time recording medium when performing a high speed recording operation, the cost of additionally purchasing a one-time recording medium can be saved. On the other hand, the usability of the rewritable recording medium can be enhanced. The present invention can fulfill this need.

SUMMARY OF THE INVENTION

The main goal of the present invention is to provide a recording device and method that can perform a recording operation onto a rewritable optical recording medium with a recording speed selected from one of a plurality of recording speeds for a one-time optical recording medium. Therefore, the cost of additionally purchasing a one-time recording medium can be saved since the rewritable recording medium can replace the one-time recording medium when performing a high speed recording operation. On the other hand, the usability of the rewritable recording medium can be enhanced.

In order to achieve the above goal, the present invention provides a recording apparatus characterized in that it comprises a firmware configured to execute the following operation: performing a recording operation onto a rewritable optical recording medium with a recording speed selected from one of a plurality of recording speeds for a one-time optical recording medium. The recording layer of the rewritable optical recording medium comprises at least four elements from Ge, In, Sb, Te, and Sn. The component proportion of Sb/Te is ranged from 3 to 8. The thickness of the recording layer is ranged from 3 nm to 25 nm.

In order to achieve the above goal, the present invention provides a recording method characterized in that: performing a recording operation onto a rewritable optical recording medium with a recording speed selected from one of a plurality of recording speeds for an one-time optical recording medium. The recording layer of the rewritable optical recording medium comprises at least four elements from Ge, In, Sb, Te, and Sn. The component proportion of Sb/Te is ranged from 3 to 8. The thickness of the recording layer is ranged from 3 nm to 25 nm.

By utilizing the recording apparatus and method of the present invention, the cost of additionally purchasing a one-time recording medium can be saved since the rewritable recording medium can replace the one-time recording medium when performing a high speed recording operation. The usability of the rewritable recording medium can also be enhanced.

BRIEF DESCRIPTION OF DRAWINGS

The objections, functions, features and advantages of the invention will be appreciated more fully from the following further description thereof with reference to the accompanying drawings wherein.

DETAILED DESCRIPTION OF SPECIFIC EMBODIMENTS

The following exemplary examples will be described in detail with the appended drawings in order to make the aforementioned objectives, functional features, and advantages more clearly understood.

According to the present invention, there provides a recording apparatus characterized in that it comprises a firmware configured to execute the following operation: performing a recording operation onto a rewritable optical recording medium with a recording speed selected from one of a plurality of recording speeds for an one-time optical recording medium. According to the present invention, there provides a recording method characterized in that it performs a recording operation onto a rewritable optical recording medium with a recording speed selected from one of a plurality of recording speeds for an one-time optical recording medium. For example, the recording speed for a rewritable recording media (such as, DVD-RW) may be 1×, 2×, 4×, 6× and the highest speed is 6×. The recording speed for an one-time recording media (such as DVD-R) may be 1×, 2×, 4×, 6×, 8×, 10×, 12×, 14×, 16× and the highest speed is 16×. In the situation that needs to save time, the recording apparatus can perform the recording operation onto the DVD-RW with a recording speed of 8×, 10×, 12×, 14×, or 16×. In a preferred embodiment, the highest speed (in this case, the recording speed of 16×) is used to perform the recording operation.

Figure 1:
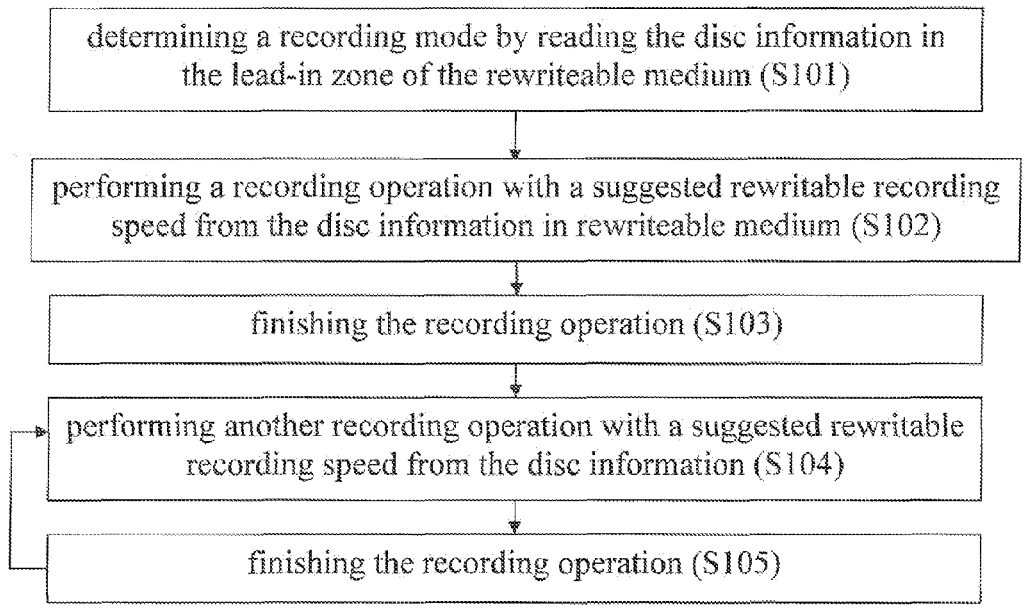
FIG. 1 shows a flow chart of a conventional rewritable recording medium when performing a recording operation.
Figure 2:
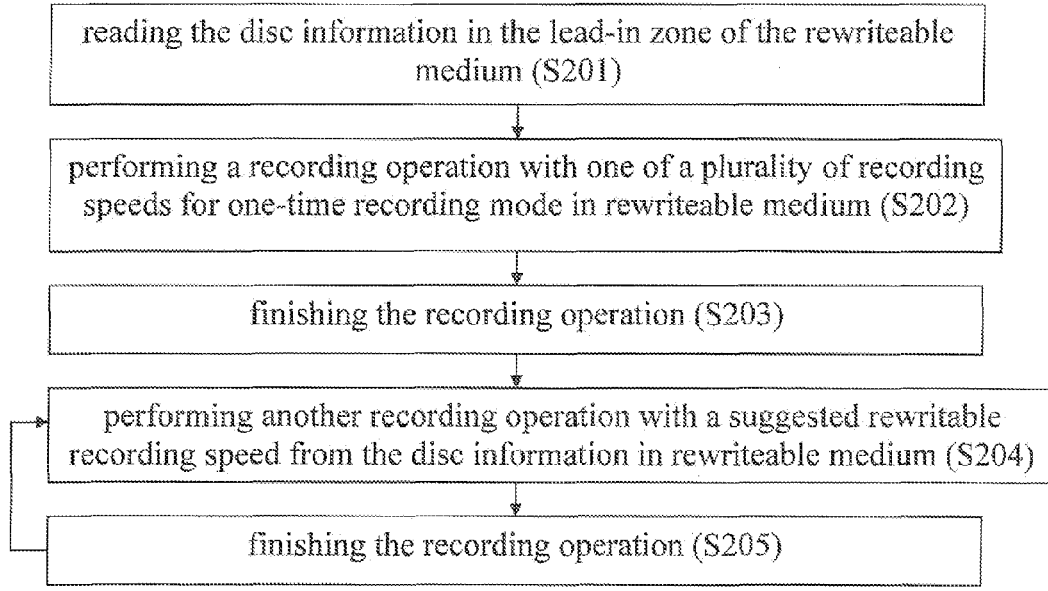
FIG. 2 shows a flow chart of a rewritable recording medium when performing a recording operation according to the present invention.

FIG. 2 shows a flow chart of a rewritable recording medium when performing a recording operation according to the present invention. When it is the first time to use a rewritable recording medium (that is, a recording operation is never performed), a recording operation may be performed onto the rewritable optical recording medium with a recording speed selected from one of a plurality of recording speeds for an one-time optical recording medium. As shown in FIG. 2, in step S201, the recording apparatus reads the disc information in the lead-in zone of the rewriteable medium. In step S202, the recording apparatus performs a recording operation with one of a plurality of recording speeds for one-time recording mode in rewriteable medium. In step S203, the recording operation is finished. After that, when the user wants to perform another recording operation with the rewritable recording medium, in step S204, the recording apparatus performs another recording operation with a suggested rewritable recording speed from the disc information in rewriteable medium. In step S205, the recording operation is finished. Step S204 and Step S205 can repeat according to the user's need.

From above, according to the present invention, when it is the first time to use a rewritable recording medium (that is, a recording operation is never performed), a recording operation may be performed onto the rewritable optical recording medium with a recording speed selected from one of a plurality of recording speeds for an one-time optical recording medium. Therefore, a faster recording speed may be provided.

According to an embodiment of the present invention, the recording layer of the rewritable optical recording medium comprises at least four elements from Ge, In, Sb, Te, and Sn, and the component proportion of Sb/Te is ranged from 3 to 8, and the thickness of the recording layer is ranged from 3 nm to 25 nm, and preferably 12 nm.

Figure 3:
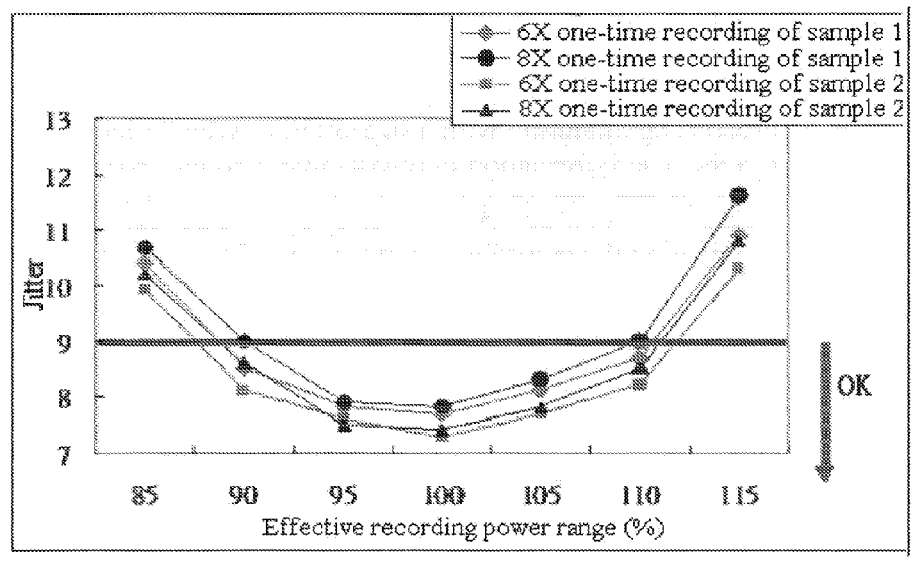
FIG. 3 shows the electrical characteristics of recording operation of performing high speed (6× or 8×) one-time recording operation onto a low-speed BD-RE disc.
Figure 4:
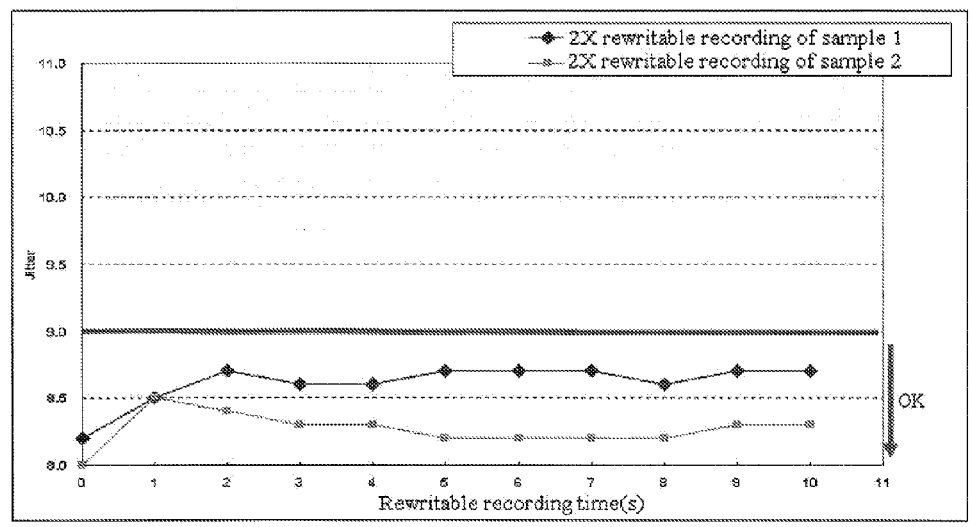
FIG. 4 shows the electrical characteristics of the recording operation of performing a low-speed (2×) rewritable recording operation after performing a high speed one-time recording operation onto a low-speed BD-RE disc.

According to an embodiment of the present invention, the electrical characteristics of recording operation of performing high speed (6× or 8×) one-time recording operation onto a low-speed (2×) BD-RE disc (sample 1 and sample 2) present a good quality that satisfies the specification requirement. As shown in FIG. 3, the jitter is lower than 9.0 when the effective recording power range is from 90% to 110%. Regarding the component proportions of the discs of sample 1 and sample 2, the component proportion of Ge:In:Sb:Te of the disc of sample 1 is 4.2:3.0:73.0:19.8; and the component proportion of Ge:In:Sb:Te:Sn of the disc of sample 2 is 4.3:9.2:51.7:11.0:23.8. Moreover, according to an embodiment of the present invention, the electrical characteristics of the recording operation of performing a low-speed (2×) rewritable recording operation after performing a high speed one-time recording operation onto a low-speed BD-RE disc (sample 1 and sample 2) also present a good quality that satisfies the specification requirement. As shown in FIG. 4, the jitter is lower than 9.0 when the rewritable recording time(s) is from 0 to 10. The component proportions of the discs of sample 1 and sample 2 are the same as the above.

Therefore, by utilizing the recording apparatus and method of the present invention, the cost of additionally purchasing a one-time recording medium can be saved since the rewritable recording medium can replace the one-time recording medium when performing a high speed recording operation. Also, the usability of the rewritable recording medium can be enhanced.

While various exemplary embodiments of the present invention are described herein, it should be noted that the present invention may be embodied in other specific forms, including various modifications and improvements, without departing from the spirit and scope of the present invention. Thus, the described embodiments are to be considered in all respects only as illustrative and not restrictive.

What is claimed is:

1. A recording apparatus characterized in that comprising a firmware configured to execute the following operation:
   performing a recording operation onto a rewritable optical recording medium with a recording speed selected from one of a plurality of recording speeds for an one-time optical recording medium that can be used only one time, wherein the recording speed selected from one of a plurality of recording speeds for the one-time recording media is faster than the recording speed for a rewritable recording media;
   wherein the recording layer of the rewritable optical recording medium comprises at least four elements from Ge, In, Sb, Te, and Sn, wherein the component proportion of Sb/Te is ranged from 3 to 8, and the thickness of the recording layer is ranged from 3 nm to 25 nm.

2. A recording apparatus according to claim 1, wherein the recording speed is the highest speed.

3. A recording apparatus according to claim 1, wherein the thickness of the recording layer is 12 nm.

4. A recording method characterized in that:
   performing a recording operation onto a rewritable optical recording medium with a recording speed selected from one of a plurality of recording speeds which is faster than the read-write speed of the rewritable optical recording medium for an optical recording medium that can be used only one time;
   wherein the recording layer of the rewritable optical recording medium comprises at least four elements from Ge, In, Sb, Te, and Sn, wherein the component proportion of Sb/Te is ranged from 3 to 8, and the thickness of the recording layer is ranged from 3 nm to 25 nm.

5. A recording method according to claim 4, wherein the recording speed is the highest speed.

6. A recording method according to claim 4, wherein the thickness of the recording layer is 12 nm.

* * * * *